United States Patent [19]

Thompson

[11] Patent Number: 4,918,578

[45] Date of Patent: Apr. 17, 1990

[54] LIGHT PIPING DISPLAYS

[76] Inventor: Kenneth W. Thompson, 5641 173rd St. W., Farmington, Minn. 55024

[21] Appl. No.: 251,258

[22] Filed: Sep. 30, 1988

Related U.S. Application Data

[63] Continuation-in-part of Ser. No. 96,956, Sep. 15, 1987, abandoned.

[51] Int. Cl.4 .............................................. F21V 7/04
[52] U.S. Cl. ...................................... 362/31; 362/812; 40/547
[58] Field of Search .................... 362/31, 32, 812, 252; 180/249, 68.6; 40/546, 547, 204, 205, 588

[56] References Cited

U.S. PATENT DOCUMENTS

| | | | |
|---|---|---|---|
| 1,950,548 | 3/1934 | Fuller, Jr. ......................... | 362/31 X |
| 2,644,113 | 6/1953 | Etzkorn ........................... | 362/260 X |
| 3,197,902 | 8/1965 | Buzan ............................... | 40/546 |
| 3,591,941 | 7/1971 | Joffe, Jr. ......................... | 40/546 |
| 4,271,458 | 6/1981 | George, Jr. ..................... | 362/236 |
| 4,385,343 | 5/1983 | Plumly ............................. | 362/32 X |
| 4,453,200 | 6/1984 | Trcka et al. .................... | 362/31 |
| 4,475,298 | 10/1984 | Muoroz ........................... | 40/546 |
| 4,715,137 | 12/1987 | Schive ............................. | 40/546 |

FOREIGN PATENT DOCUMENTS 1091225  4/1955  France ................................ 362/31

Primary Examiner—Ira S. Lazarus
Assistant Examiner—Peggy A. Neils
Attorney, Agent, or Firm—Robert C. Baker

[57] ABSTRACT

A visual display device illuminated by flexible and shock absorbing edge-lighting means is provided. The device includes a transparent panel of light piping material and a light-scattering design integrated with the panel. The transparent panel has a light-receiving edge along the perimeter thereof. A flexible plastic-exterior light string comprises lighting elements housed in a light refracting conduit. The light string is nudged and pressed against the light-receiving edge of the transparent panel to deform the refracting conduit of the light string to the contour of the edge.

25 Claims, 2 Drawing Sheets

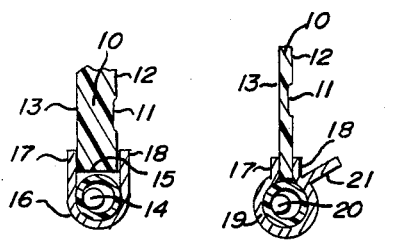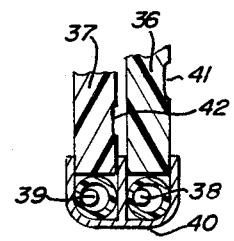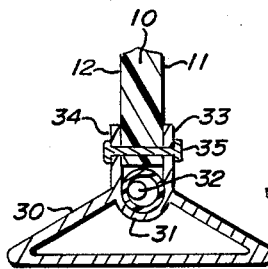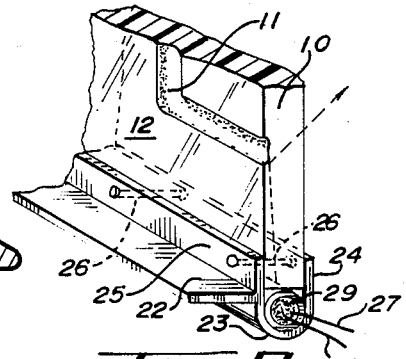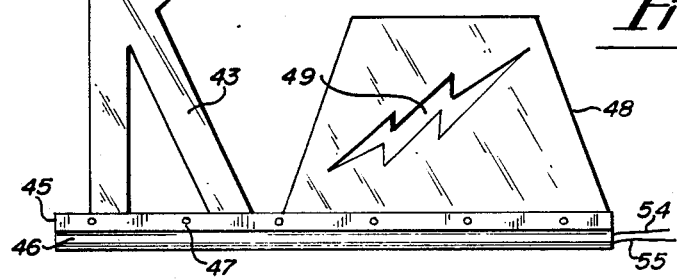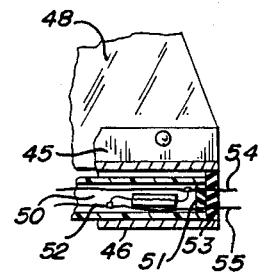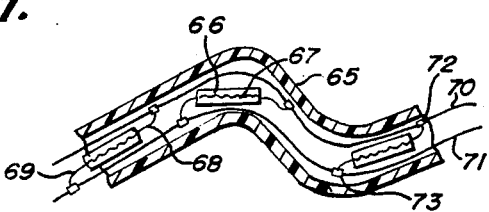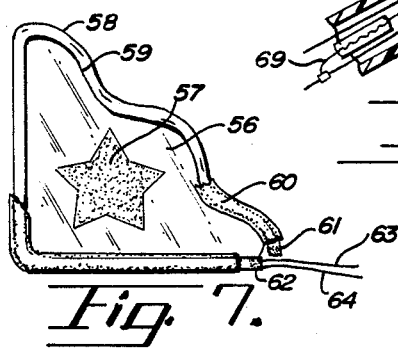

LIGHT PIPING DISPLAYS

CROSS REFERENCE TO RELATED APPLICATION

This is a continuation-in-part of my application Ser. No. 07/096,956, filed Sept. 15, 1987 now abandoned.

BACKGROUND OF THE INVENTION

This invention relates to light piping displays, and more particularly to light piping displays having flexible shock absorbing edge lighting means for improved light transmission to the display panel, and especially to such displays having edge lighting means of exceedingly small transverse dimension. The invention permits the formation of displays which appear to be almost magically lighted.

By practice of the invention, a multitude of novel light piping displays may be formed with but nominal and almost insignificant border areas. Vehicles may be decorated with unique displays or signs which are edge-lighted from the normal low voltage source such as 12 volts characteristic of vehicles. The invention permits the manufacture of bug shields of unique display features for automobiles. Curved and flat panels of light piping material may be employed for displays according to the invention. Perimeter edges of the light piping panels for the displays of the invention may assume a wide variety of forms. The perimeter edges may define different letters of the alphabet, or special shapes as desired. The edges themselves may serve as the light-scattering design visually apparent to a viewer, with the body of the panel serving as the light piping medium. Additionally, however, the body of the panel which serves as the light piping medium may have a surface roughened or otherwise altered to create light-scattering and thereby provide a light-scattering design entirely within the perimeter edges of the panel. Light-scattering panels of material different from the panel of light piping material may be employed.

The edge lighting source according to the teachings of the invention is flexible and readily conformable for linearly and nudgingly contiguous placement along a portion (or along the entirety) of the perimeter edge of the transparent panel of light piping material, whether the perimeter edge is straight or is irregular. The edge may be scalloped or curved either in a direction transverse to the panel or parallel with the panel of light piping material.

Flexible light sources have been known for well over 30 years, as for example illustrated in Etzkorn U.S. Pat. No. 2,644,113 of 1953. The flexible light sources have also been improved over the last 30 years. Light piping displays have of course been heretofore proposed, and are extremely old, but none heretofore known have provided the exceedingly compact and versatile edge lighting and resulting versatility of visual effect made possible by the teachings of this invention. Insofar as known, no one has heretofore remotely suggested or discovered the benefits of nudging a flexible light string against a light-receiving edge in the formation of a light piping display.

SUMMARY OF THE INVENTION

The invention provides novel display devices illuminated by edge-lighting means of an exceedingly compact and versatile character. The display devices include a transparent panel of light piping material and a light-scattering design integrated with the panel. A flexible light string comprising a flexible plastic light refracting conduit with lighting element housed in it supplies light to the transparent panel. The flexible light string serves as a shock absorber to protect the lighting elements from physical damage. The flexible plastic-exterior light string extends as a linearly contiguous element along at least 5 percent of the linear distance of the total perimeter of the transparent panel at a light-receiving edge thereof. The light refracting conduit is preferably nudged against the light-receiving edge so as to deform the light refracting conduit at least partially to the contour of the light-receiving edge. The light refracting conduit bends light toward the normal at the inner surface of the light refracting conduit to transmit the light to the light-receiving edge and thus into the transparent panel. The deformed light string is fixed at a light-receiving edge of the transparent panel for transmission from the string through the light-receiving edge into the transparent panel; and this may be accomplished in a variety of ways. U-shaped holders may be used with the light string in the cavity of the U-shape. Adhesive holding means may be employed. Holders of U-shaped cross-section may be light-reflective or mirror-like on their interior surface at the cavity position to enhance movement of light from the string into the panel of light piping material and thereby enhance the degree or intensity of light escaping the panel at a light-scattering design.

The preferred form for the light string is that of a flexible cylindrical plastic tube having light source means within it. The maximum transverse dimension of the light string should not exceed one centimeter and preferably not exceed 7 millimeters, with the most ideal and most preferred maximum transverse dimension for the light string being no greater than about 4 or 5 millimeters. Minimum transverse dimensions, even as little as 2 or 3 millimeters, facilitate the creation of lightweight displays having a light string which in essence is no thicker than the thickness of the light piping panel. But even displays having light strings up to twice the thickness of a thin light piping panel, but no greater than one centimeter in thickness (i.e., maximum transverse dimension) permit the creation of durable shock resistant displays which almost give the impression of lacking any significant light source.

Other features and benefits of the invention will be evident as this description proceeds.

BRIEF DESCRIPTION OF THE DRAWING

FIG. 1 is a schematic cross-sectional view taken at a transverse through an edge-lighted display of the invention, with part of the panel of light piping material broken away;

FIG. 2 is likewise such a schematic cross-sectional view illustrating the edge-lighting means within a bulbular but still substantial U-shaped holder;

FIG. 3 is a schematic perspective view of a display device of the invention, with substantial portions broken away, illustrating in particular the relationship between the transparent panel and a holder for the light string, plus a mounting bracket;

FIG. 4 is a schematic cross-sectional view of a further embodiment of the invention, illustrating particularly a pedestal support incorporated with a general U-shaped holder for the light string, with portions of the panel broken away;

FIG. 5 is a schematic cross-sectional view at the edge-lighting means of a modified display device of the invention, particularly illustrating two different transparent panels and two light strings, plus holder means for the assembly, with portions of the transparent panels broken away;

FIG. 6 is a schematic plan or frontal view, with parts broken away, of an edge-lighted display device of the invention having one transparent panel in the shape of a "K" (with the perimeter of the "K" serving as the light-scattering design) and having another transparent panel with a light-scattering lightening bolt etched on the back surface of it, with a holder for both and for the flexible light string;

FIG. 7 is a frontal view of a sign having a light-scattering star of different panel material from the light piping panel, and having the entire perimeter of the sign, including curved portions of the perimeter, equipped with a flexible light string according to the invention and held in place by adhesive tape which is partially broken away;

FIG. 8 is an enlarged view of a longitudinal section through a flexible light string of the invention with parts broken away;

FIG. 9 is an enlarged fragmentary schematic sectional view of an end of the light string and holder of FIG. 6, with the enlargement particularly illustrating the fillers which plug an end of the light string and an end of the U-shaped channel holder;

Figure 10:
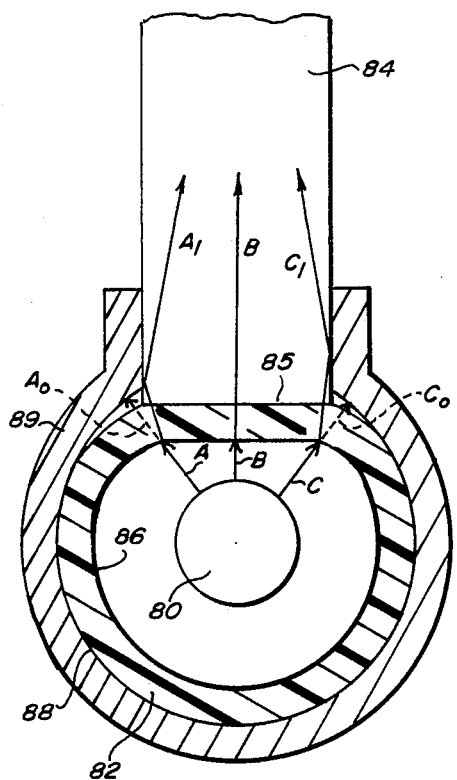
FIG. 10 is an enlarged fragmentary transverse sectional view illustrating detail of the light string and a flat-edged transparent panel nudged and pressed together, with the string deformed, and also illustrating the refraction of light through the light refracting conduit of the light string into the light receiving edge of the transparent panel.

It is emphasized that FIGS. 1-9 are highly schematic and thus do not illustrate the details of refraction and details of the deformation of the plastic refracting conduit of the light string to the contour of the light-receiving edge of the transparent panel for improved lighting of the transparent panel. The nudging and pressing deformation of the refracting conduit is especially and specifically illustrated in the enlarged and detailed showings of FIGS. 10 and 11.

DESCRIPTION OF PREFERRED EMBODIMENT

Referring particularly to FIG. 1, the transparent panel of light piping material 10 has a light-scattering design 11 etched or carved in the rear or back surface 12 of the panel. That rear surface 12 is commonly referred to as the second surface; and the outer surface or front surface 13 facing a viewer under normal conditions is referred to as the first surface. The first and second outer surfaces are equidistantly spaced in all light piping portions thereof. Indeed, that is a characteristic of light piping panels, as is now well known in the art. A light-scattering design, if painted on instead of etched or carved on a surface of the transparent panel 10, permits all portions of the panel to be equidistantly spaced as between the first and second surfaces. Also, where the light-scattering design is at some edge of the panel, all other portions of the first and second surfaces may be equally spaced for the light piping phenomenon. In light piping, light entering an edge of the transparent panel strikes the front and rear surfaces of the transparent panel at a relatively slight angle to those surfaces (e.g., close to parallel with those surfaces or at least no more than about 60° from those surfaces), and is substantially reflected and refracted within the panel without escaping outwardly of the sides (i.e., front and rear surfaces) until the light strikes a light-scattering design, whether that design is within the panel or at an outer edge of the panel.

Figure 11:
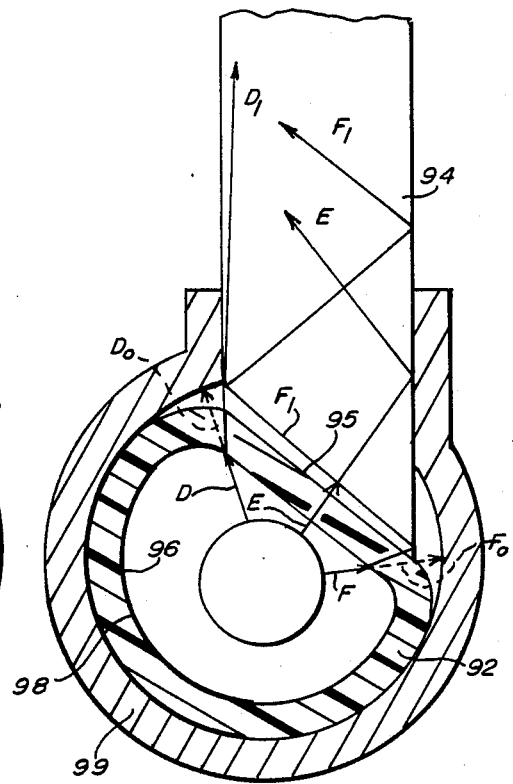
FIG. 11 is an enlarged fragmentary transverse sectional view illustrating detail of the light string and a bevel-edged transparent panel nudged and pressed together, with deformation of the light string, and also illustrating the refraction of light through the of the light string into the sloped or tapered light receiving edge into the transparent panel.
Figure 12:
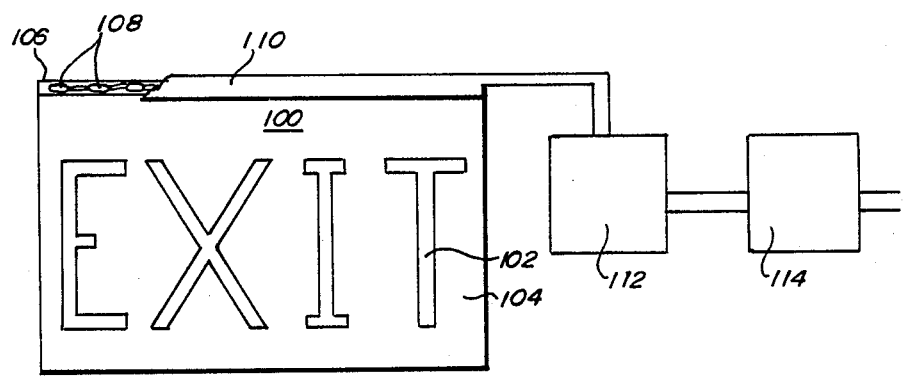
FIG. 12 is a schematic frontal view of an "EXIT" sign connected to an emergency battery and a transformer.

To be noted in connection with FIG. 1 is that the flexible plastic-exterior light string 14 is linearly contiguous along a light-receiving edge 15 of the transparent light piping panel 10. Illustratively, a U-shaped channel 16 of extruded aluminum may be employed to hold or fix the light string 14 at the light-receiving edge 15, with the lip sections 17 and 18 of the U suitably serving as gripping clamps for pinchingly gripping the border edge of the transparent panel to hold the light string 14 against the light-receiving edge 15. The light string 14 is located within the cavity of the U-shape. The lighting elements (as shown in FIGS. 10 and 11) of the flexible light string 14 are protected from being crushed by the transparent panel by securing the panel in the nudging position against the light string and by the shock absorbing flexible light refracting conduit which houses the lighting elements. Advantageously, extruded aluminum (see FIG. 1) provides an interior reflective surface more or less parabolic cross-sectional shape and somewhat mirror-like in character. This somewhat parabolic reflective surface on the of the U-shaped extrusion functions to reflect light from the flexible string 14 and substantially directs light from that string through the light-receiving edge 15 of the transparent panel for light piping within the panel. A display device having an edge lighting means and arrangement as illustrated in FIG. 1 may suitably be clamped in any desired position by means of an exterior clamp fitted on any base or support member, whether on a vehicle or on a stationary object.

It should be recognized that transparent panels of light piping material contemplated by the invention are relatively thin and normally will not exceed about one centimeter in thickness, and may be as thin as a millimeter or two. Especially attractive displays have been formed with light piping material of a thickness of approximately two millimeters.

The illustration in FIG. 2 is in all respects comparable to that in FIG. 1, and like numbering is employed except for the substantially U-shaped aluminum holder which has a bulbular U-shape 19 with lip edges 17 and 18. The light string 20 in FIG. 2 has a maximum transverse dimension almost twice that of the thickness of the transparent panel 10; thus a bulbular shape for the U-shaped holder is employed. A lateral flange 21 is integrated with the U-shaped holder and is useful for mounting purposes.

The showing in FIG. 3 is quite comparable that in FIG. 1 with the exception that a transverse mount flange 22 is provided on the U-shaped metal holder 23, and the view is toward the rear or second surface 12 of the transparent panel 10. Also, the lips 24 and 25 of the U-shaped holders are fastened to border edges of the transparent panel 10 by rivets 26 or any other suitable fastening means. Electrical conduits or wires 27 and 28 are shown extending outwardly from the end 29 of the light string within the cavity of the U-shape. The wires are for connection to an electrical power source and any suitable connecting means may be employed.

Referring particularly to FIG. 4, a pedestal 30 of triangular cross-section with a flat bottomed surface may be employed as the support for holding a display device of the invention in operable display position. Suitably incorporated as part of the triangular support or even unified with the triangle support, is a U-shaped holding structure 31 which functions as the recess holder for fixing the flexible light string 32 contiguously against a light-receiving edge of the transparent panel 10 of light piping material. Lip extremities 33 and 34 of the U-shape are fastened by rivets 35 to a border edge of panel 10.

Sometimes it is desirable to employ more than one light piping panel and to place them either in spaced laterally adjacent condition or in stacked condition, one behind another, so as to create further unusual lighting effects, sometimes with special colors for the light-scattering design of one panel as compared to another. FIG. 5 illustrates such a stacked arrangement of one transparent panel 36 behind another 37 with a separate light string 38 and 39 for each panel and each light string nudged contiguously against the respective light-receiving edge of panel 36 and 37 by means of a U-shape holder 40 which is more or less a double U in shape. Again, the panels of light piping material may be held in place by means of riveting (not shown) or other elongated fastening means extending through holes in the transparent panels and lip edges of the generally U-shaped holder. Light-scattering designs 41 and 42 may carry different color tints or other visual effects for viewing.

In FIG. 6, a transparent light piping panel 43 consisting of the letter K and having its peripheral edges 44 serving as the light-scattering means is fixed between lip portions 45 of a generally U-shaped holder 46 by means of riveting 47. A further transparent light piping panel 48 having a light-scattering lightening symbol 49 is included in FIG. 6 and held between the upper lip edges 45 of the U-shaped holder 46 also by riveting 47. The light-scattering symbols may be configured to form business and house number signs.

The U-shaped holder 46 of FIG. 6 is shown enlarged in FIG. 9 and is one wherein the cavity of the U is somewhat bulging (as bulging is illustrated in FIG. 2). Within the cavity is the flexible light string 50. Further illustrated in FIG. 9 is a plug 51 in the end of the light string 52, as well as a continuation of that plug as a plug or closure 53 in the end of the U-shaped holder. Any suitable plastic material, such as for example a transparent silicone caulking material, may be employed as a plugging or filler material. A filler or plug of this type serves as a barrier against dirt and water entrance into the light string as well as into the cavity of the U-shaped holder. Electrical wires 54 and 55 extend out through the filler at one end of the U-shaped holder. It will be appreciated that both ends of the generally U-shaped holder should be plugged with any suitable filler having an adhesive characteristic but curing or drying to a non-sticky or non-adhesive condition.

The display device in FIG. 7 has a transparent light piping panel 56 with a star-shaped light-scattering design 57 integrated with it and suitably formed by literally cutting the star shape out of the transparent light piping panel and inserting in the star cutout a mating star design cut from a sheet or panel of light-scattering material different from the material of the light piping panel. The insert suitably is bonded in position by a transparent edge bonding adhesive such as, for example, an epoxy. Such a light-scattering material may be, for example, a light activated phosphorescent material or even a fluorocarbon-type plastic.

The use of reflective particle light-scattering materials in a transparent panel may cause uneven distribution of display light such that the light-scattering material closest the light source is the brightest. The light-scattering materials most preferably employed contain a mixture of fluorescent and light scattering reflective materials so as to enhance more uniform light scattering throughout a light-scattering design.

Again referring to FIG. 7, the light transmitted through the light piping layer is significantly scattered at the edges of the star and also passes into the star to give more or less a neon lighting effect. Also, in the structure of FIG. 7, a light string 58 entirely surrounds the perimeter edge 59 and is nudgingly contiguous to all portions of the edge, even those portions curved as illustrated in the drawing. For illustrative purposes, an opaque adhesive tape 60 (partially broken away) is employed to hold the light string in nudged contiguous position along the perimeter edge; and a small edge of the tape is adhesively secured against a very narrow border strip laterally to the very perimeter edge of the transparent light piping panel. Again, an adhesive filler 61 and 62 is employed to fill the ends of the flexible light string and provide a seal against the entry of dirt. The adhesive filler selected should set up or dry or cure to a non-adhesive condition; an silicone caulk adhesive has been found to be especially useful. The electrical wires 63 and 64 for the light string extend through the filler and are connected to any suitable power source by any suitable connectors.

A preferred flexible light string for practice of the invention is illustrated in FIG. 8. The string suitably comprises a light refracting conduit 65 constructed of a flexible plastic exterior and in fact a flexible plastic tube. The wall thickness of the plastic tube may vary but generally will be approximately the same thickness throughout the tube. Usually the wall thickness will not exceed a millimeter or so, possibly as much as two millimeters, and may be as thin as a half or quarter millimeter. Polyethylene is one of the more flexible plastics and is suitably employed for the tube. Other organic plastic materials or equivalents of flexible nature may however be equally useful. Within the tube are a plurality of spaced incandescent glass bulbs 66 of minute character. They suitably may be somewhat cylindrical in shape and have a diameter or maximum transverse dimension of about 2 millimeters up to about 4 millimeters or even 5 or 6 millimeters, or even 8 millimeters. The bulbs themselves suitably are formed of glass and are equipped with an incandescent filament 67. Connecting electrical conductive wires 68 and 69 for the bulbs are somewhat filamentary or hairline in character and embedded in the walls of the bulbs to seal the interior of the bulb from exterior oxidative environment. The thin hairline type wiring serving as the conductor to the internal filament of the bulb is suitably fastened to main conducting lines or wires 70 and 71 extending through the length of the flexible light string by means of clamping connectors 72 and 73 or soldering or the like. The main lines 70 and 71 are suitably electrically insulated. The main lines 70 and 71 bend with the movement of the flexible light string. The plastic of the light string is transparent and, if desired, may be tinted. If tinted, the result is that of a tinting for the light emitted from the light-scattering design.

The transparent light refracting conduit or plastic tube has an index of refraction greater than air. When the light from the bulb passes from the air into the tube, it is bent toward the normal or toward the perpendicular with respect to the inner surface of the plastic tube. This refracted or bent light then travels through the plastic tube and through its outer surface and into the light receiving edge of the transparent panel. Nudging of the tube against the edge of the transparent panel reduces the amount of air interface possibilities between the tube and panel, which enhances light flow from the tube into the panel. Spacing of the bulbs within the light string may be as close as a bulb at each centimeter along the length of the string, although spacing suitably may be greater, such as at every 2 or 3 or even 5 or 6 centimeters along the length of the string. Indeed, spacing as great as 8 or 10 centimeters may be employed, but with less intensity of lighting for the transparent light piping panel, as will readily be appreciated. If desired, the flexible light string may be formed of solid plastic about the bulbs and wiring; and this may be done using organic monomers polymerized in situ to form the solid organic plastic mass of transparent character for the flexible string. However, this is not ideal because it terminates the bulb-air-plastic interface most desirably employed to cause bending of light toward the light-receiving edge.

The light string conduit is flexible enough to be bent 180° such that the light string may be bent upon itself or folded in half. This enables the light string to follow essentially any change of direction in a transparent panel between 0° and 180°. The light string can be easily folded to follow the light-receiving edge of a 90° corner in a transparent panel. It is preferably bent between the bulbs 66. When the light string is bent at a bulb 66 it does not bend as sharply and thus does not follow as square of a path as it follows when bent between bulbs 66. The flexible light refracting conduit also serves as a shock absorber or buffer which protects the incandescent bulbs 66 from damage from shock or shaking actions caused by persons bumping the display sign or by road conditions when the sign is used on vehicles.

In the practice of the invention, the transparent light piping panel preferably is formed of polymethyl methacrylate materials or other acrylic type materials having the properties for light piping as described. Equivalent plastics, of course, may be substituted. Glass is useful but is brittle. The transparent light piping panel should never exceed a centimeter in thickness and preferably will not exceed about 6 or 7 millimeters and may be as thin a possible, such as, for example, a couple millimeters.

The improved transmission of light (see FIG. 10) is created by refracting light from lighting element 80 through the wall of the light refracting conduit 82 to the light-receiving edge 85 of transparent panel 84. The light refracting conduit 82 is illustratively deformed such that the inner and outer surfaces 86 and 88 of the light conduit are generally parallel with the light receiving edge. The light rays A, B and C travel from the lighting element 80 through the air around it and then pass into the plastic conduit. They pass through the conduit wall from the inner surface 86 to the outer surface 88 of the light refracting conduit. They are bent or refracted into the light-receiving edge 85. For example, the light rays A and C are bent by the light refracting conduit 82 toward the normal of the inner surface 86 as they pass from the air media into the flexible plastic media of the conduit. The normal to inner surface 86 is defined by a line which extends transversely through the light refracting plastic conduit 82 and is perpendicular to the plane of the inner surface at the point the light ray strikes the refracting conduit. The light rays $A_1$ and $C_1$ demonstrate the path of the refracted light into the panel. Light rays $A_o$ and $C_o$ demonstrate that path of light rays that would not be transmitted through the light receiving edge but for the deformed flexible light refraction conduit at its nudged portion abutting panel edge 85. The light ray B travels straight through the light refracting conduit parallel to the normal of the inner surface 86. The greater the index of refraction of the light refracting conduit, the greater the bending of more light toward light-receiving edge.

Referring to FIG. 11, the light-receiving edge 95 may be sloped or tapered and the benefits of refraction as discussed fully realized to further enhance the amount of light entering the light-receiving edge 95. The tapered or beveled light-receiving edge 95 has a greater amount of surface area as compared to an equally thick panel having a perpendicular or flat light receiving edge 85 as in FIG. 10. The increased surface area of the light-receiving edge increases the light entering features for the transparent panel 94. The light refracting conduit 92 is deformed such that the contour of the inner and outer surfaces 96 and 98 (at their location adjacent the beveled edge) are more or less parallel to the light-receiving edge 95. The holder means 99 holds the deformed light refracting conduit 92 against the tapered light-receiving edge 95. The edge 95 is suitably pressed deeply into the holder. The deformed light refracting conduit 92 bends light from lighting element 90 into the light receiving edge 95 of transparent panel 94. The light rays D and F strike the inner surface 96 of the light refracting plastic wall 92 and are bent toward the normal of the inner surface 96. The light rays $D_1$ and $F_1$ illustrate paths of the refracted light through the transparent panel 94. The dotted lines $D_o$ and $F_o$ demonstrate the light rays path missing the light receiving edge as they would if they were not refracted by the light refracting conduit 92. The light ray E is parallel to the normal of the inner surface 96 as well as the outer surface 98 of the plastic wall, and also normal to the bevel or sloped surface of the panel 94. Thus the light ray E is not bent as it passes from the source into the light receiving edge 95.

In all embodiments, the front and back or first and second outer surfaces of the basic transparent light piping panel should be equidistantly spaced. The panel itself however may be curved into a cylinder or other shape as desired. The light-scattering design for the panel may be at edges of the panel or on the rear or second surface, or a separate structure as illustrated in FIG. 7. The rear or second surface is more easily protected against dirt or other contamination as for example by sealing a protective sheet against it if desired. Where a protective backups is employed, attention should be given to the optics so as not to employ a backups layer which would diffuse or scatter light striking the plane of the light piping transparent panel material. Of course, where a light-scattering design is intended, a backups material suitable to effect that light scattering may indeed be sealed to the rear or second surface of the panel. Another important consideration is that of having edges for the light piping panel which will receive light from the light string. It is unnecessary that all edges be capable of receiving light from the light string. Further, it is unnecessary that the light string extend completely around a panel in all instances, although light strings completely around light piping panels are useful and especially important where a relatively large light piping panel is employed and a light-scattering design of relatively large area is used. Generally, a minimum of 5 percent and preferably at least about 25 percent of the perimeter edge of a transparent light piping panel should be capable of receiving light such as from the flexible light string of the invention. Usually the light-receiving edge or edges will be perpendicular to the outer surfaces of the light piping panel.

The flexible light string of the invention should be noted to have a maximum transverse dimension less than 1 centimeter thick; and that maximum transverse dimension should not exceed three times the thickness of even the thinnest of transparent light piping panels and preferably never exceed twice the thickness of any transparent light piping panel employed in the practice of the invention. Especially useful are those light strings and transparent panel combinations where the light string is about equal in maximum transverse dimension to the thickness of the panel.

Fixing the light string in linearly contiguous relationship for nudging and pressing and deformation against a light-receiving edge of the light piping panel may be accomplished in a variety of ways. Transparent organic plastic or adhesive materials (pressure sensitive or those cured or dried to a non-adhesive condition) are useful to that end, including those polymerized or cured in situ. While opaque U-shaped members (tape or rigid metal or plastic) are preferably employed (most preferably with reflective interiors at the cavity portion), other shapes may be useful.

Low voltage power sources such as 12 volts (as common for automobiles) are useful as well as higher voltage such as 110 volts, with of course appropriate construction of the illumination elements of the light string for the electrical power source employed. Minute bulbs for 17 volt power sources as well as for higher voltage are known to the art, but low voltages no greater than 25 volts permit great versatility and safety of use. Preferably bulbs which operate at voltages between or about 6 and 17 volts are used.

The low voltage flexible light string also works very well for construction of an "EXIT" sign 100. The sign is formed by employing light-scattering symbols 102 spelling "EXIT" in a transparent panel 104. A mountable holder means 110 preferably nudges the light string 106 against the light-receiving edge of the panel. The lighting elements 108 require very low wattage to be illuminated and are backed by an emergency battery power supply 112 that continues the lighting after a loss of building electrical power. A transformer 114 is employed for the light string 106. The lower power requirement allows versatile use of the "EXIT" sign. It may be electrically powered by existing building wiring (with battery backups in case of power failure), whereas conventional "EXIT" signs require their own circuit. This greatly reduces the cost of installation. Two transparent panels containing the light scattering symbols "EXIT" are suitably placed back to back with an opaque divider between them to prevent the transmission of light from one side through to the other. The back to back panels form an "EXIT" sign which is viewable from the front and rear directions. The flexible light string deformably nudged and pushed against the light-receiving edge of the transparent panel effectively and economically lights the "EXIT" sign.

The fundamental thrust of this invention is that of providing visual display devices illuminated by novel edge lighting means which protects the bulbs from breakage and which refract light to the transparent panel to cause the devices to appear to the casual observer to be almost miraculously illuminated inasmuch as the edge-lighting means is so very limited in its bulk or transverse dimensions. Little bulk is added at an edge of the light piping panel.

The invention may of course be embodied in other specific forms than those illustrated without departing from the spirit or essential characteristics thereof. The illustrated embodiments are therefore to be considered in all respects as nonrestrictive, the scope of the invention being indicated by the appended claims rather than by the meaning and range of equivalency of the claims are therefore intended to be embraced thereby.

That which is claimed is:

1. A visual display device illuminated by edge-lighting means, comprising:

a transparent panel of light piping material and a light-scattering design integrated with said panel, said transparent panel having equidistantly spaced first and second outer surfaces in all light piping portions thereof and defining the thickness thereof, said transparent panel additionally having a light-receiving perimeter edge along the perimeter thereof, a readily conformable flexible bendable and deformable cylindrical shock absorbing light string comprising a flexible cylindrical transparent light refracting plastic conduit as the outer element of said light string, and lighting elements housed in the interior of said refracting conduit for emitting light radially outward to said light refracting conduit, and holder means nudging said light string linearly contiguously against said light-receiving edge, said holding means fixing said light string in conformable relationship against said light-receiving edge of said transparent panel such that radially outward light from said lighting elements is refracted through said light refracting conduit to said light-receiving edge and into said transparent panel, the relationship between said transparent panel and light string and holder means being such that said design of said transparent panel appears to be miraculously illuminated because of the limited bulk of said light string and said holder means at said light-receiving edge.

2. The visual display devise of claim 1 wherein said holder means comprises means substantially U-shaped in cross-section and wherein said light string is snugly recessed in the cavity of the U-shape.

3. The visual display device of claim 2 wherein said holder means has an interior light-reflecting surface.

4. The visual display device of claim 1 wherein said holder means comprises an adhesive.

5. The visual display device of claim 4 wherein said adhesive is in the form of an adhesive tape, and wherein said tape extends about portions of the light string other than the portion nudged contiguously against the light-receiving edge of the panel, said tape being adhesively attached at its edges to opposite sides of said panel.

6. The visual display device of claim 1 wherein said holder means comprises a unitary extruded U-shaped holder of metal with the outer lip portions of the U-shape embracing outer border surfaces of the transparent panel adjacent said light-receiving edge thereof and wherein said light string is snugly recessed in the cavity of the U-shape.

7. The visual display device of claim 1 wherein said holder means comprises an organic plastic.

8. The visual display device of claim 1 wherein said transparent panel comprises an illuminated EXIT sign.

9. The visual display device of claim 1 wherein said light-scatterng design comprises an insert panel of light-scattering material different from said material of said transparent panel, said insert panel having outer surfaces substantially aligned with the outer surfaces of said transparent panel.

10. The visual display device of claim 9 wherein said insert panel includes both fluorescent and reflective materials.

11. The visual display device of claim 1 wherein said light-receiving edge is tapered from said first to said second outer surface.

12. The visual display device of claim 1 wherein said transparent panel of light-piping material is no greater than about 2 millimeters thick.

13. The visual display device of claim 1 wherein said lighting elements operate at a voltage below 25 volts.

14. The visual display device of claim 1 wherein said visual display device is mounted at the front of a vehicle to function as a bug shield.

15. A visual display device illuminated by compact edge-lighting means, comprising:
a transparent panel of light piping material not over 7 millimeters thick and a light-scattering design integrated with said panel, said transparent panel having equidistantly spaced first and second outer surfaces in all light piping portions thereof, and defining the thickness thereof, said transparent panel additionally having a light-receiving perimeter edge along the perimeter thereof, said light-receiving edge comprising at least 5% of the linear distance of the total perimeter of said panel,
a readily conformable flexible bendable and deformable shock absorbing cylindrical plastic-exterior light string having a maximum transverse dimension no greater than one centimeter and having no transverse dimension greater than two times the thickness of said transparent panel, said light string consisting essentially of a flexible transparent organic plastic tubing, a pair of electrical conductors extending through the tubing, and spaced lighting elements electrically connected to said electrical conductors, and
opaque holder means nudging said light string linearly contiguously against said light-receiving edge to flexibly deform said light string against the contour of said light-receiving edge, the relationship between said transparent panel and light string and holder means being such that said design of said transparent panel appears to be miraculously illuminated because of the limited bulk of said light string and said holder means at said light receiving edge.

16. The visual display device of claim 15 wherein said opaque holder means comprises means substantially U-shaped in cross-section and wherein said light string is snugly recessed in the cavity of the U-shape.

17. The visual display device of claim 15 wherein said opaque holder means comprises an adhesive.

18. The visual display device of claim 17 wherein said adhesive is in the form of an adhesive tape, and wherein said tape extends about portions of the light string other than the portion nudged contiguously against the light-receiving edge of the panel, said tape being adhesively attached at its edges to opposite sides of said panel.

19. The visual display device of claim 15 wherein said opaque holder means comprises a unitary extruded U-shaped holder of metal with the outer lip portions of the U-shape embracing outer border surfaces of the transparent panel adjacent said light-receiving edge thereof and wherein said light string is snugly recessed in the cavity of the U-shape.

20. The visual display device of claim 15 wherein said opaque holder means comprises an organic plastic.

21. The visual display device of claim 15 wherein said light-scattering design comprises an insert panel of light-scattering material different from said material of said transparent panel, said insert panel having outer surfaces substantially aligned with the outer surfaces of said transparent panel.

22. The visual display device of claim 15 wherein said transparent panel of light-piping material is not over about 2 millimeters thick.

23. A vehicle equipped with a visual display device according to claim 15, said vehicle having a low voltage electrical source connected to an electrical conductor in said light string.

24. The structure of claim 23 wherein said visual display device is mounted at the front of the vehicle to function as a bug shield.

25. A visual display device illuminated by compact edge-lighting means, comprising:
a transparent panel of light piping material not over 7 millimeters thick and a light-scattering design integrated with said panel, said transparent panel having equidistantly spaced first and second outer surfaces in all light piping portions thereof and defining the thickness thereof, said transparent panel additionally having a light-receiving perimeter edge perpendicular to said outer surfaces, said light-receiving edge comprising at least 5% of the linear distance of the total perimeter of said panel,
a readily conformable flexible cylindrical plastic-exterior light string nudged linearly contiguously against said light-receiving edge, said light string having a maximum transverse dimension not greater than one centimeter and having no transverse dimension greater than two times the thickness of said transparent panel, said light string consisting essentially of a flexible organic plastic tubing, a pair of electrical conductors extending through the tubing, and spaced lighting elements electrically connected to said electrical conductors, and
an adhesive tape holder nudging said light string linearly against said light-receiving edge for transmission of light from said string through said light-receiving edge into said panel, said adhesive tape being adhesively attached at its edges to opposite sides of said panel and extending about portions of said light string other than the portion nudged contiguously against the light receiving edge of the panel.

* * * * *